Feb. 14, 1967     F. JAKOB ETAL     3,303,765
AUTOMATIC ZEROING ASSEMBLY FOR CAMERAS
Filed Oct. 9, 1963
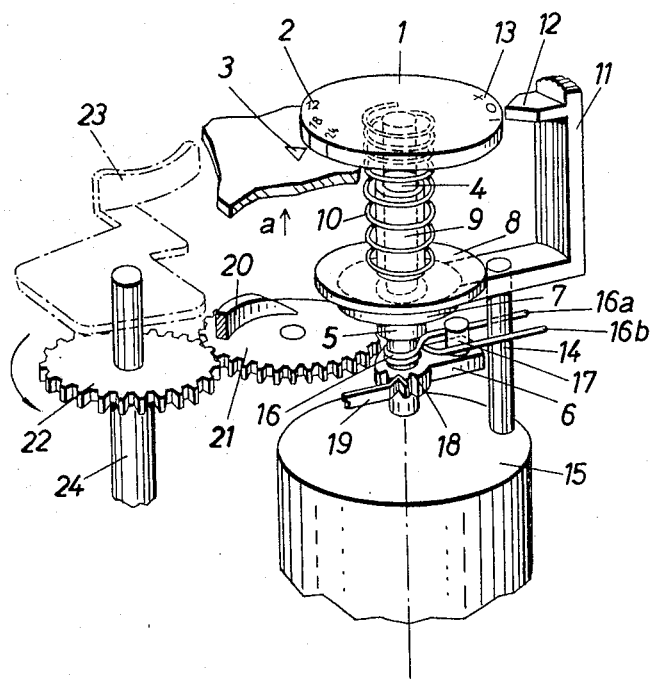
INVENTOR.
FRANZ JAKOB
KARL WAGNER
BY United States Patent Office 3,303,765
Patented Feb. 14, 1967

3,303,765
AUTOMATIC ZEROING ASSEMBLY FOR CAMERAS
Franz Jakob, Unterhaching, and Karl Wagner, Munich, Germany, assignors to Agfa Aktiengesellschaft, Leverkusen, Germany
Filed Oct. 9, 1963, Ser. No. 314,988
Claims priority, application Germany, Oct. 16, 1962, A 18,969
8 Claims. (Cl. 95—10)

The present invention relates to cameras.

More particularly, the present invention relates to cameras which are at least semi-automatic in the sense that at least one of the camera settings can be made automatically or there is provided in an automatic manner an indication of the proper setting for a factor such as exposure time or aperture, so that the operator can then make the setting in accordance with the automatic indication thereof.

With cameras of this type it is necessary when a subject of great or little contrast is photographed to introduce a correction factor. For example, if a photograph with back lighting is made the camera is automatically corrected to compensate for the lesser light in which the subject is located so that details of the subject will appear against a brightly illuminated background.

Although structures of this type are satisfactory for the photograph for which the correction factor has been introduced, they present a drawback with respect to subsequent photographs which do not require a correction factor. Thus, the operator when making such subsequent photographs can easily forget to remove the correction setting and thus through carelessness such subsequent photographs will be improperly exposed because they have been made with a setting which has been corrected in a manner which is not required.

It is accordingly a primary object of the present invention to provide a camera of the above type which is capable of automatically zeroing the structure which introduces a correction factor whenever the camera is set to make an exposure subsequent to that which required the correction factor.

Another object of the present invention is to provide a structure which will automatically zero the structure which introduces a correction factor of the above type whenever a structure such as the film-transporting structure of the camera is actuated to move the next unexposed film frame in position to be exposed.

Still another object of the present invention is to provide an exceedingly simple structure which will operate reliably to accomplish the above objects.

Also, it is an object of the present invention to provide a structure of the above type which is exceedingly compact and in which one or more elements can each perform a multiplicity of functions.

With the above objects in view the invention includes, in a camera which is at least semi-automatic, a manually operable correcting means movable from a zero position to a selected correction position for introducing a correction factor when photographing a subject of great contrast. A zeroing means urges the correcting means back toward the zero position thereof, and a releasable holding means releasably holds the correcting means in a selected correction position in opposition to the zeroing means. A manually operable moving means is actuated by the operator preparatory to making another exposure immediately following the exposure for which said correcting means was placed in a selected correction position, and this moving means has a portion which, whenever the moving means is actuated preparatory to making the next exposure, engages the holding means, moves it to a position releasing the correcting means to the zeroing means to be returned thereby to the zero position, and then moves away from the holding means so that the latter will again releasably hold the correcting means in a selected correction position.

The novel features which are considered as characteristic for the invention are set forth in particular in the appended claims. The invention, itself, however, both as to its construction and its method of operation, together with additional objects and advantages thereof, will be best understood from the following description of a specific embodiment when read in connection with the accompanying drawing, in which there is shown in perspective only so much structure as is required to provide a complete understanding of the invention.

Referring to the drawing, there is shown therein the manually turnable knob 1 which is turned by the operator to introduce the factor of the speed of the film which is used in the camera. Thus, in the illustrated example the knob 1 carries a scale of film speeds 2 which cooperates with a stationary index 3 located, for example, on the fragmentarily illustrated top wall of the camera above which the knob 1 is located. This knob 1 as well as a clutch disc 5 and a carrier 6 are fixed to a rotary shaft 4 which is supported for rotary movement in any suitable unillustrated bearings. A second clutch disc 7 is located next to the clutch disc 5 and is formed with an opening through which the shaft 4 freely passes so that the disc 7 is capable of turning and shifting axially with respect to the shaft 4, and over the disc 7 is located a presser-disc 8 of a larger diameter than and coaxial with the disc 7, the disc 8 also being freely turnable and axially shiftable with respect to the shaft 4. The presser-disc 8 is fixed to one end of an elongated sleeve 9 which extends upwardly from the disc 8 and through which the shaft 4 also passes freely so that the sleeve 9 guarantees free movement of the disc 8 relative to shaft 4. A spring 10 is coiled around the sleeve 9, presses with one end against the underside of the knob 1 and with its opposite end against the top face of the disc 8 to urge the latter downwardly.

The structure includes a manually operable correcting means for introducing a selected correction factor when making a photograph of great contrast, and this correcting means includes the manually engageable angle member 11 which is fixed at one end to the clutch disc 7, extending radially therefrom, and which fixedly carries adjacent its other end a pointer member 12 cooperating with a scale of correction factors 13 also carried by the knob 1, the correcting means 11 being normally located in a zero position, as illustrated, where no correction factor has been introduced.

The correcting means 11 is fixed by an elongated pin 14 to the housing of a moving-coil instrument such as the galvanometer 15, this pin 14 being fixed at its ends respectively to the angle member 11 and the galvanometer 15. This instrument includes an unillustrated pointer adapted to be scanned in a manner well known in the art for automatically setting a factor such as exposure time or aperture or both into the camera or adapted to have its position sensed by an indicating member which indicates to the operator the proper setting for the exposure time or aperture, as is also well known in the art.

A zeroing means urges the correcting means 11 to its illustrated zero position, and in the illustrated example the zeroing means takes the form of a wire spring 16 which extends around the shaft 4 and has a pair of free legs 16a and 16b respectively located on opposite sides of and engaging the pin 14. These legs also extend on opposite sides of and engage a pin 17 fixed to and extending upwardly from the carrier member 6. Instead of a single spring 16, it is possible to use a pair of leaf springs fixed to the shaft 4 and extending therefrom respectively along the lines occupied by the legs 16a and 16b. Also, it is possible to use instead of spring 16 at least one magnet which seeks to turn the correcting means relative to the shaft 4 to the illustrated zero position.

The carrier 6 is also provided with teeth 18 forming part of a releasable detent structure which includes the spring 19 the unillustrated end of which is fixed to a stationary part of the camera and the illustrated end of which is V-shaped and extends into the space between a pair of adjoining teeth 18 for releasably holding the shaft 4 and thus the instrument 15 in a selected angular position. It is to be noted that the shaft 4 is speced at its bottom end from the instrument 15. The shaft 4 is connected to the instrument 15 only through the slip clutch 5, 7, the element 11, and the pin 14. Therefore, when the knob 1 is turned to introduce the film speed into the camera, the shaft 4 turns and through the slip clutch 5, 7, the element 11, and the pin 14 turns the instrument 15, which is coaxial with the shaft 4, for placing the instrument 15 at an angular position which will compensate for the particular speed of the film. The element 11 will at this time simply turn together with the shaft 4 and the knob 1 and will have no movement relative to the knob 1. The force of the spring 19 in cooperation with teeth 18 is sufficient to hold the shaft 4 and the knob 1 stationary in opposition to the force of the friction clutch and the spring 16 when the element 11 is turned by the operator, so that when a correction factor is introduced the operator simply turns element 11 and the instrument 15 turns relative to the shaft 4 to introduce the further compensation according to the selected correction position, and at this time the disc 7 slips with respect to the disc 5 while one or the other of the legs 16a and 16b is displaced by the pin 14 away from the pin 17.

The camera includes a manually operable moving means actuated by the operator preparatory to making the exposure immediately following the one for which the correction has been made by displacing element 11 from its zero position, and in the illustrated example this moving means is shown as including the elements 21–24 which form part of the film-transporting structure for transporting the next film frame into position to be exposed. This moving means thus includes the manually engageable lever 23 fixed to the rotary shaft 24 which fixedly carries the gear 22 which meshes with the rotary gear 21, and the latter gear turns whenever the lever 23 is actuated by the operator to displace the next unexposed film frame into position to be exposed in a manner well known in the art. Of course, instead of manually turning the shaft 24, this shaft can be turned by an electric or spring motor.

In accordance with the present invention the moving means 21–24 includes a portion 20 in the form of a cam fixed to the gear 21 for rotary movement therewith, and this cam 20 turns in a space which is occupied by a peripheral portion of the pressure-disc 8 which projects beyond the clutch disc 7. Whenever the moving means is actuated preparatory to making the next exposure, the portion 20 thereof moves into engagement with the disc 8, raises it in the direction of the arrow a away from the disc 7, and then releases the disc 8 to be returned by the spring 10 back to its position pressing against the disc 7. While the disc 8 is thus raised the spring 16 will automatically zero the element 11. Thus, the friction clutch assembly 5–10 forms a holding means which releasably holds the correcting means 11 in a selected correction position in opposition to the zeroing means 16 while the moving means 21–24 whenever it is actuated preparatory to making the next exposure will have its portion 20 move into engagement with the releasable holding means, place the latter in a position releasing the correcting means 11 to the zeroing means 16 to be zeroed thereby, and then moving away from the releasable holding means so that the latter can return to its position for releasably holding the correcting means in a selected correction position. Because the legs 16a and 16b cooperate with the pin 17, the return of the element 11 to its zero position is guaranteed.

It will be noted that with the above construction the same element, namely the instrument 15, is used to introduce the film speed as well as the correction introduced by manipulation of element 11. Although this construction is preferred because of its simplicity and compactness and because the same instrument 15 can be used to perform a multiplicity of functions, nevertheless this feature is not absolutely essential and it is possible to introduce the correction effected by element 11 by structure other than the instrument 15. For example, the element 11 may be used to automatically position a cover element which covers the light which reaches a photocell or the like to an extent determined by the position of element 11, so that the correction can be introduced in this way, or the element 11 may be used to automatically adjust a variable resistor in the electrical circuit of the light-responsive assembly for the same purpose.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera which is at least semi-automatic, in combination, manually operable correcting means movable from a zero position to a selected correction position for introducing a correction factor when photographing a subject of extreme contrast; holding means operatively connected to said correcting means for releasably holding the latter in a selected correction position; zeroing means including at least one spring which when said correcting means is placed in a selected correction position is stressed for urging said correcting means back to said zero position thereof, said holding means releasably holding said correcting means in a selected correction position in opposition to said zeroing means; manually operable moving means actuated by the operator preparatory to making another exposure immediately following the exposure for which said correcting means was placed in a selected correction position, said manually operable moving means forming part of a structure for moving the next film frame in position to be exposed, said moving means having a portion which engages said holding means, moves the latter to a position releasing said correcting means to said zeroing means to be returned thereby to said zero position, and then moves away from said holding means so that the latter will again releasably hold the correcting means in a selected correction position, whenever said moving means is actuated preparatory to making the next exposure; setting means for setting into the camera the factor of film speed; and clutch means interconnecting said setting means and correcting means, said clutch means when engaged transmitting movement of said setting means to said correcting means and when disengaged providing free movement of said correcting means relative to said setting means.

2. In a camera as recited in claim 1, said clutch means being a slip clutch.

3. In a camera which is at least semi-automatic, in combination, manually operable correcting means including a lever turnable from a zero position to a selected correction position for introducing a correction factor when photographing a subject of great contrast; a first pin fixed to said lever; a second pin having a position corresponding to said zero position; spring means having a pair of legs between which said pins are located and cooperating with said first pin for urging said lever to said zero position as determined by the cooperation of said pair of legs with said second pin; holding means releasably holding said lever in a selected correction position in opposition to said spring means; and manually operable moving means actuated by the operator preparatory to making an exposure immediately following the exposure for which said correcting means was placed in a selected correction position, said moving means having a portion which, whenever said moving means is actuated preparatory to making the next exposure, engages said holding means, moves the latter to a position releasing said correcting means to said spring means to be zeroed thereby, and then moves away from said holding means so that the latter will again releasably hold said lever in a selected correction position.

4. In a camera which is at least semi-automatic, in combination, setting means for setting into the camera the factor of film speed, said setting means including a rotary shaft and a knob fixed thereto; a clutch disc fixed to said shaft; a second clutch disc freely turnable on said shaft and engaging said first clutch disc; a manually turnable lever fixed to said second clutch disc and forming part of a correcting means for introducing a selected correction when photographing a subject of great contrast; a presser-disc freely turnable on and axially shiftable with respect to said shaft, said presser-disc being located next to said second clutch disc; spring means urging said presser-disc against said second clutch disc to urge the latter toward said first-mentioned clutch disc to maintain a clutch, formed by said clutch discs, engaged; and a rotary cam forming part of a structure which is actuated preparatory to making an exposure and which turns, when the latter structure is actuated, along a path displacing said presser-disc momentarily away from said second clutch disc to release said clutch for movement to a disengaged position enabling said lever to be returned to a zero position.

5. In a camera as recited in claim 4, spring means operatively connected to said lever for returning the latter to said zero position when said presser-disc is momentarily displaced from said second clutch disc.

6. In a camera as recited in claim 4, said presser-disc being of a larger diameter than said second clutch disc and having an outer peripheral portion extending beyond said second clutch disc and engaged by said cam.

7. In a camera as recited in claim 6, said clutch discs cooperating to form a slip clutch.

8. In a camera which is at least semi-automatic, in combination, a rotary shaft; a knob fixed to said shaft for turning the same; a first slip clutch element fixed to said shaft; a second slip clutch element freely turnable on said shaft and engaging said first slip clutch element; a presser-disc freely turnable with respect to and axially shiftable along said shaft, said presser-disc being located next to said second clutch element; spring means urging said presser-disc against said second slip clutch element for frictionally urging the latter against said first slip clutch element; a lever accessible to the operator and fixed to said second slip clutch element for manually turning the latter; a first pin parallel to said shaft and fixed to and extending from said lever; a galvanometer housing coaxial with said shaft and fixed also to said first pin so that through said clutch elements said knob may be turned to turn said lever and galvanometer housing with said shaft to introduce the factor of film speed while during slipping of said second clutch element relative to said first element said lever may be turned for turning said galvanometer housing relative to said shaft for introducing a correction factor when photographing a subject of great contrast; detent means cooperating with said shaft for maintaining the latter stationary during slipping of said second element relative to said first element; a second pin carried by said detent means and remaining stationary with respect to said shaft; spring means cooperating with said first and second pins for returning said lever to a zero position when said presser-disc is displaced away from said clutch element; and rotary cam means cooperating with said presser-disc for displacing the latter from said second clutch element momentarily whenever the operator sets the camera to make an exposure subsequent to that for which said lever has been turned for introducing a correction factor.

References Cited by the Examiner

UNITED STATES PATENTS

| 2,967,469 | 1/1961 | Lachaize | 95—31 |
| 3,082,672 | 3/1963 | Swarofsky et al. | 95—10 |
| 3,099,194 | 7/1963 | Weiss et al. | 95—10 |
| 3,111,072 | 11/1963 | Jakob et al. | 95—10 |
| 3,220,329 | 11/1965 | Coleman | 95—64 |

FOREIGN PATENTS 1,305,077  8/1962  France.

NORTON ANSHER, *Primary Examiner.*

J. M. HORAN, *Examiner.*

J. F. PETERS, *Assistant Examiner.*